United States Patent
Yamauchi et al.

(10) Patent No.: US 8,754,857 B2
(45) Date of Patent: Jun. 17, 2014

(54) DISPLAY APPARATUS, DISPLAY APPARATUS DRIVING METHOD, AND ELECTRONIC DEVICE

(75) Inventors: Yuko Yamauchi, Tokyo (JP); Hiroshi Mizuhashi, Kanagawa (JP); Yoshiharu Nakajima, Kanagawa (JP); Tsutomu Tanaka, Kanagawa (JP)

(73) Assignee: Japan Display West, Inc., Chita (JP)

( * ) Notice: Subject to any disclaimer, the term of this patent is extended or adjusted under 35 U.S.C. 154(b) by 509 days.

(21) Appl. No.: 12/650,679

(22) Filed: Dec. 31, 2009

(65) Prior Publication Data

US 2010/0188346 A1 Jul. 29, 2010

(30) Foreign Application Priority Data

Jan. 23, 2009 (JP) ................................. 2009-012548

(51) Int. Cl.
*G06F 3/041* (2006.01)

(52) U.S. Cl.
USPC ......................................................... 345/173

(58) Field of Classification Search
USPC .............................. 345/76, 81, 173, 204, 211
See application file for complete search history.

(56) References Cited

U.S. PATENT DOCUMENTS

| 2002/0167505 | A1* | 11/2002 | LeChevalier | 345/204 |
| 2006/0007215 | A1* | 1/2006 | Tobita et al. | 345/204 |
| 2006/0220077 | A1* | 10/2006 | Hayashi et al. | 257/291 |
| 2007/0070047 | A1 | 3/2007 | Jeon et al. | |
| 2008/0231564 | A1* | 9/2008 | Harada et al. | 345/81 |
| 2009/0102802 | A1* | 4/2009 | Pietri et al. | 345/173 |
| 2010/0110058 | A1* | 5/2010 | Moh et al. | 345/211 |

FOREIGN PATENT DOCUMENTS

| JP | 2007-095044 | 4/2007 |
| TW | 2006-08339 | 3/2006 |

* cited by examiner

*Primary Examiner* — Quan-Zhen Wang
*Assistant Examiner* — Tony Davis
(74) *Attorney, Agent, or Firm* — Robert J. Depke; The Chicago Technology Law Group, LLC

(57) ABSTRACT

Disclosed herein is a display apparatus including: a display block configured to have a plurality of picture elements; a switch arranged inside the display block and configured to be closed by an external pressure; a detection block configured to detect whether the switch is closed based on a comparison between a signal supplied from the switch and a reference signal; a precharge block configured to give a precharge potential to a wire conducting with one of electrodes of the switch before detection is executed in the detection block; and a detection block potential supply block configured to give a predetermined potential to a wire conducting with the other electrode of the switch before detection is executed in the detection block.

9 Claims, 17 Drawing Sheets

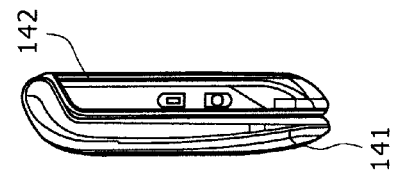
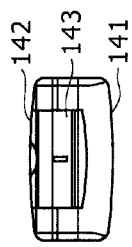
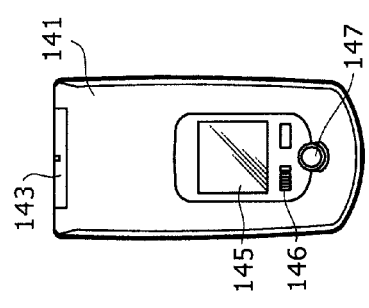
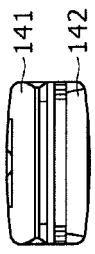
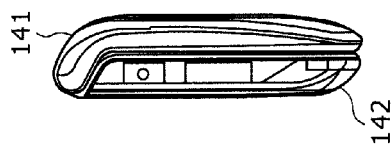
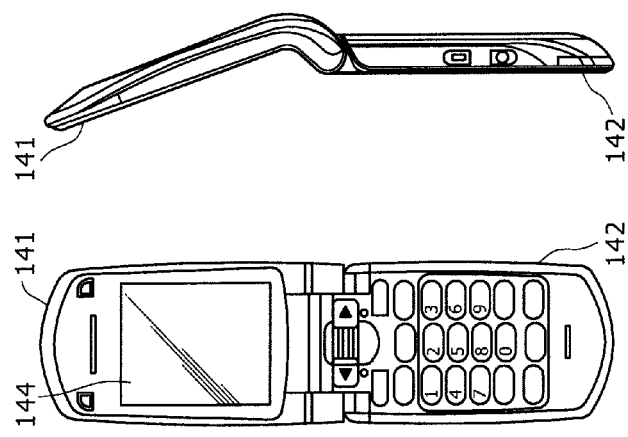

DISPLAY APPARATUS, DISPLAY APPARATUS DRIVING METHOD, AND ELECTRONIC DEVICE

The present application claims priority to Japanese Patent Application No. JP 2009-012548 filed in the Japanese Patent Office on Jan. 23, 2009, the entire content of which is hereby incorporated by reference.

BACKGROUND OF THE INVENTION

1. Field of the Invention

The present invention relates to a display apparatus having a switch providing a touch sensor on a display block of the display apparatus, a method of driving the display apparatus, and an electronic device.

2. Description of the Related Art

In the past, the coordinate detection for detecting display positions on a display apparatus by the pressing of a stylus or a finger has been implemented by a position sensing device externally attached to the display block of the display apparatus. However, the recent requirements for the higher picture quality and the higher picture definition in the display monitors of mobile apparatuses have been prompting propositions of integrating a position sensing device and a display monitor into one unit (refer to Japanese Patent Laid-Open No. 2001-75074 for example).

SUMMARY OF THE INVENTION

Sensor-integrated display apparatuses having sensor capabilities of input position sensing as described above are able to prevent the reduction in picture quality and display quality as compared with models having external sensing devices attached thereto, at the cost of troubles due to the incorporation of a sensor in a picture element.

To be more specific, one of the problems is that, as a result of the incorporation of a position sensing device, the electrode and wiring for the sensing element must be located near the display drive element, wiring, and electrode. In this arrangement, driving the sensing element may cause such a noise on the display wiring and so on as coupling. In order to prevent this noise from being generated, insulation processing and a certain arrangement space must be provided, thereby increasing the number of manufacturing steps.

Further, the noise such as coupling for example on the sensing wiring and so on by display driving presents a problem. Especially, the noise on the sensing wiring and so on requires the consideration of the possibility of noise on the sensing circuit, thereby making it possible to introduce a detection error.

In addition, in order to increase the resolution of each sensor to be arranged in a display area, it is essential to increase the number of sensors. If this is done, the deterioration of picture quality and the adverse effect for production yield are caused in order to implement sensor light blocking. And, if the brightness of the backlight for preventing the picture quality deterioration is increased, the increase in power dissipation is inevitable. Further, the increase in resolution increases the number of drives of a sensor detection circuit, which will lead to the increase in power dissipation.

Therefore, the present invention addresses the above-identified and other problems associated with related-art methods and apparatuses and solves the addressed problems by providing a technology capable of executing the stable detection of sensors while suppressing the increase in power dissipation even if many sensors are arranged in a display apparatus.

In carrying out the invention and according to one embodiment thereof, there is provided a display apparatus. This display apparatus has a display block configured to have a plurality of picture elements; a switch arranged inside the display block and configured to be closed by an external pressure; a detection block configured to detect whether the switch is closed based on a comparison between a signal supplied from the switch and a reference signal; a precharge block configured to give a precharge potential to a wire conducting with one of electrodes of the switch before detection is executed in the detection block; and a detection block potential supply block configured to give a predetermined potential to a wire conducting with the other electrode of the switch before detection is executed in the detection block.

In carrying out the invention and according to another embodiment thereof, there is provided a method of driving a display apparatus having a display block having a plurality of picture elements and a switch arranged inside the display block, having an electrode closed by an external pressure. This method has the steps of giving a precharge potential to a wire conducting with one of electrodes of the switch before a period in which a drive element for driving each of the plurality of picture element is on; and giving a detection potential to a wire conducting with another electrode of the switch after giving the precharge electrode and before giving a video signal to each of the plurality of picture elements in the period in which the drive element is on, thereby determining whether the switch is closed.

According to the above-mentioned invention, a precharge potential is given from the precharge block to the wire conducting with one of the electrodes of the switch before detection is executed by the detection block, so that the initial state of the potential at the time of detection by the switch can be clarified. In addition, in executing detection in the detection block, a predetermined potential is given from the detection block potential supply block to the wire conducting with another electrode of the switch, so that the potential of the signal to be transmitted to the detection block via the switch can be set as desired.

In carrying out the invention and according to still another embodiment thereof, there is provided a display apparatus. This display apparatus has a display block configured to have a plurality of picture elements; a switch, arranged between a drive element for driving one picture element inside the display block and a further drive element for driving another picture element, configured to be closed by an external pressure; a detection block configured to detect whether the switch is closed on the basis of a comparison between a signal supplied from the switch and a reference signal; and a precharge block configured to give, before executed detection in the detection block, a first precharge potential to a signal line of the drive element and a second precharge potential to a signal line of above-mentioned further drive element that is different from the first precharge potential and, when executing detection in the detection block, the second precharge potential from the signal line of above-mentioned another drive element to the switch.

In carrying out the invention and according to yet another embodiment thereof, there is provided a method of driving a display apparatus having a display block having a plurality of picture elements and a switch, arranged between a drive element for driving one picture element inside the display block and a further drive element for driving another picture element, having an electrode to be closed by an external pressure. This method has the steps of giving a first precharge potential to a signal line of the drive element; giving a second precharge potential different from the first precharge potential to a signal line of above-mentioned further drive element; clearing the first precharge potential given to the signal line of the drive element before giving a video signal to the picture element; and detecting whether the switch is closed on the basis of a comparison between the second precharge potential to be supplied to the drive element via the switch from the signal line of above-mentioned further drive element in a period in which the drive element and above-mentioned further drive element are on and before the video signal is given to the picture element and a predetermined reference potential.

According to the above-mentioned invention, a precharge potential is given to the signal line of above-mentioned drive element and the signal line of above-mentioned further drive element before detection is executed in the detection block, so that the initial state of the potential at the time of detection by the switch can be clarified. In addition, in executing detection in the detection block, the second precharge potential is given from the signal line of the above-mentioned further drive element to the switch, so that the second precharge potential is transmitted to the above-mentioned drive element via the switch.

In carrying out the invention and according to a different embodiment thereof, there is provided a display apparatus. This display apparatus has a display block configured to have a plurality of picture elements arranged in a matrix with a common potential switching for every horizontal scan period; a switch, arranged for every other picture element in the matrix of the plurality of picture elements inside the display block, configured to be closed by an external pressure; a detection block configured to detect whether the switch is closed on the basis of a comparison between a signal supplied from the switch and a reference signal; a precharge block configured to give, before executing detection in the detection block, a precharge potential to a wire conducting with one of electrodes of the switch; and a selection block configured to alternately select, in executing detection in the detection block, the switch corresponding to every other row of the plurality of picture elements and the switch corresponding to every other row that is different from the every other row of the plurality of picture elements in every horizontal scan period.

In carrying out the invention and according to a still different embodiment thereof, there is provided a method of driving a display apparatus having a display block configured to have a plurality of picture elements arranged in a matrix with a common potential switching for every horizontal scan period and a switch, arranged for every other picture element in the matrix of the plurality of picture elements inside the display block, configured to be closed by an external pressure. This method has the steps of giving a precharge potential to a wire conducting with one of electrodes of the switch before a period in which a drive element for driving each of the plurality of picture elements is on; and selecting alternately the switch corresponding to every other row of the plurality of picture elements and the switch corresponding to every other row that is different from the every other row of the plurality of picture elements in every horizontal scan period after giving the precharge potential and in the period in which the drive element is on, thereby detecting whether the selected switch is closed.

According to the above-mentioned invention, a precharge potential is given from the precharge block to the wire conducting with one of the electrodes of the switch before executing detection in the detection block, so that the initial state of the potential at the time of detection by the switch can be clarified. In addition, in executing detection in the detection block, switches corresponding to every other row are selected in every horizontal scan period, so that the detection block can execute detection on the basis of a comparison between the common potential set for every horizontal scan period and the reference signal.

As described and according to an embodiment of the present invention, the increase in power dissipation can be suppressed while executing a stable detecting operation even if many sensors are provided in a display apparatus.

BRIEF DESCRIPTION OF THE DRAWINGS

FIGS. 19A, 19B, 19C, 19D, 19E, 19F, and 19G are various views of a portable terminal apparatus, a mobile phone for example, to which the present embodiment is applied.

DETAILED DESCRIPTION OF THE PREFERRED EMBODIMENTS

This invention will be described in further detail by way of embodiments thereof with reference to the accompanying drawings. The following describes embodiments of the present invention (hereafter referred to as embodiments). It should be noted that the description will be made in the following order:

(1) Display apparatus configurations (an overall configuration, an example of switch structure, another example of switch structure, a comparison example, and a comparison example driving method);

(2) A first embodiment (a configuration having a detection block potential supply block, a configuration for giving common potential to the detection block, and a driving method);

(3) A second embodiment (a configuration in which a switch is arranged between select elements and a driving method);

(4) A third embodiment (a configuration in which a switch is arranged for every other picture element and a driving method); and (5) Electronic devices (examples of module configurations and application examples).

(1) The display apparatus configuration

[The Overall Configuration]

Figure 1:
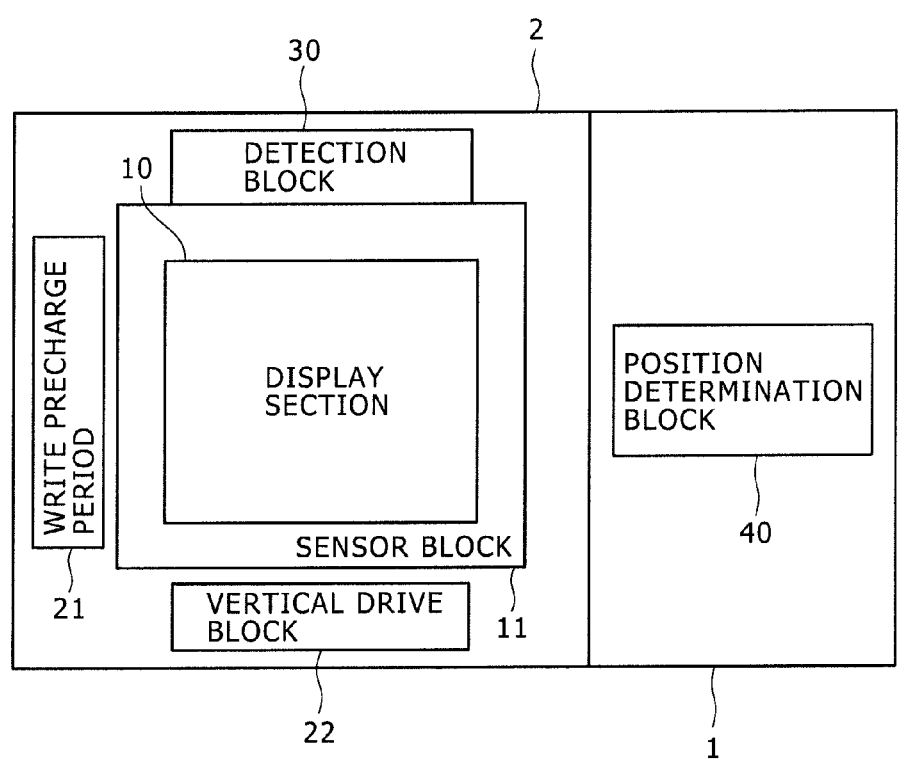
FIG. 1 is a schematic diagram illustrating an exemplary configuration of a display apparatus associated with the present embodiment of the invention.

Now, referring to FIG. 1, there is shown an exemplary configuration of a display apparatus associated with the present embodiment. To be more specific, the display apparatus associated with the present embodiment has a display section 10, a sensor block 11, a horizontal drive block 21, a vertical drive block 22, a detection block 30, and a position determination block 40.

The display apparatus is a liquid crystal display apparatus having a configuration that two substrates (a TFT substrates 1 and a counter substrate 2) are arranged in an opposed manner with a liquid crystal layer being held between these substrates. On one substrate (the TFT substrate 1), a plurality of gates lines and data lines are formed and a liquid crystal cell (or a picture element) is arranged at each intersection between these lines via a select element. The select element is a drive transistor, for which a TFT (Thin Film Transistor) is mainly used.

The display section 10 is a display area arranged in a part of the area in which the TFT substrate 1 and the counter substrate 2 are arranged in an opposing manner. The display section 10 has a liquid crystal layer held between the substrates, in the liquid crystal layer of which a plurality of liquid crystal cells (or picture elements) are arranged in a matrix manner.

The sensor block 11 is configured such that a switch having a sensor structure to be described later is arranged between the TFT substrate 1 and the counter substrate 2. This switch may be arranged in each picture element (or the liquid crystal cell), in only necessary picture elements, or in a rim of the display section 10. In the present embodiment, an example is used in which the switch is mainly arranged in picture elements.

The horizontal drive block 21 drives select elements arranged in a horizontal direction, on a line basis in a predetermined period. The vertical drive block 22 executes a drive operation in a vertical direction of the display block. In the present embodiment, a drive operation is executed in which picture elements corresponding to R (Red), G (Green), B (Blue) are sequentially selected in a horizontal scan period.

The detection block 30 is configured to detect, with a predetermined timing, a state of a switch having a sensor structure to be described later. The position determination block 40 determines, on the basis of a switch state detected by the detection block 30, positional information indicative of which switch was selected in an area on the display section 10.

In this example, a sensor structure is used in which detection electrodes are arranged at predetermined intervals, each detection electrode being provided on each of the TFT substrate 1 and the counter substrate 2. Opening/closing of these two detection electrodes implements switching. This switch puts both the detection electrodes into an electrically closed state with a pressure applied externally as an input (or an external input), thereby enabling the detection of an external input. Consequently, at least one detection electrode and a detection wire for detecting the contact in the TFT substrate 1.

In addition, the other substrate (the counter substrate 2) has an electrode (or common electrode) for supplying a common potential for image display, a detection electrode for the other side for use in contact, and a wiring for conduction with the detection electrode.

Also, in the present embodiment, although not shown, a precharge block is arranged for supplying a precharge potential to the wiring (or the detection wiring) contacting with one of the detection electrodes of the above-mentioned switch. The precharge block may be provided independently or shared by the configuration of the horizontal drive block 21 for example.

The precharge block supplies a precharge potential before a certain period in which a switch state is detected by the detection block 30. The precharge potential may be a COM (common) potential to be supplied to each picture element at the time of video display, a potential other than the COM potential, or a potential (XCOM potential) reverse to the COM potential in phase (a reversed-phase potential).

[An Example of Switch Structure]

Figure 2A:
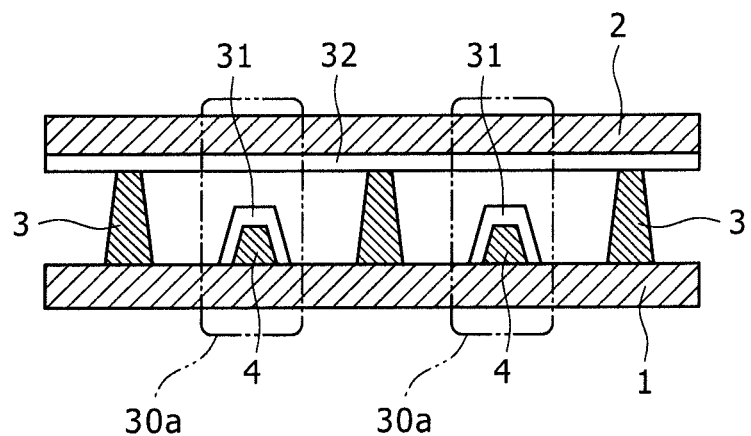
FIGS. 2A and 2B are partial cross sections of a display block.
Figure 2B:
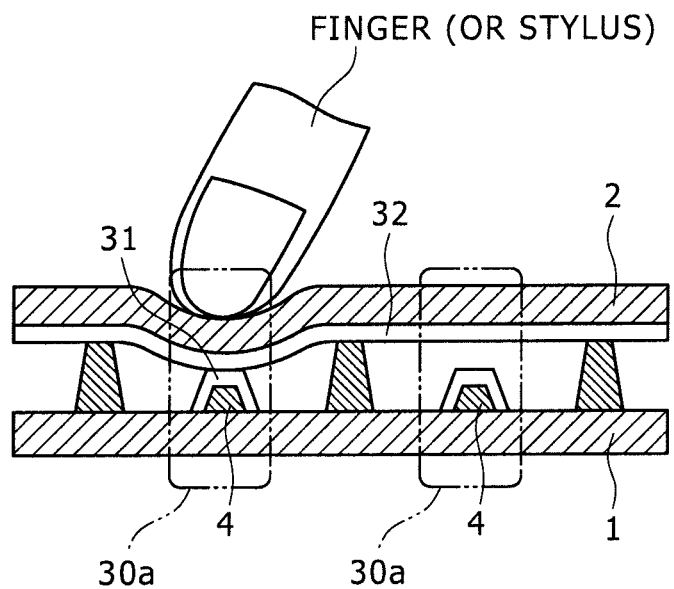

Referring to FIGS. 2A and 2B, there are shown partial cross sections of the display block. As shown in FIG. 2A, a gap between the two substrates (a TFT substrate 1 and a counter substrate 2) is defined by a plurality of spacers 3 and a sensor structure (a switch 30a) of a height equal to or less than the spacers is arranged between the spacers.

In the example shown in FIG. 2A, a projection 4 of a same material as that of the spacer 3 is arranged lower than the spacer 3 on the side of the TFT substrate 1 and a conducting layer (a detection electrode 31 on one side) is formed on the surface of this projection 4. Also, the counter substrate 2 is formed with a detection electrode 32 of the other side. The detection electrode 32 of the other side is shared by the common electrode of the counter substrate. The detection electrode 31 of the side of the TFT substrate 1 and the detection electrode 32 of the side of the counter substrate 2 configure the sensor structure (the switch 30a); in the normal state, the switch 30a of the sensor structure is kept in an open state by the spacer between both the electrodes.

As shown in FIG. 2B, when an input is given (an external input) by a pressure externally applied with a finger or a stylus for example, the counter substrate 2 flexes by the pressure, thereby making both the electrodes (the detection electrode 31 and the detection electrode 32) forming the sensor structure come in contact with each other. This puts the switch 30a into a closed state.

It should be noted that the switch 30a is not only configured by the detection electrode 31 and the detection electrode 32 arranged on both the TFT substrate 1 and the counter substrate 2, but also arranged on at least one of the TFT substrate 1 and the counter substrate 2. In any case, the configuration may be that the two detection electrodes do not conduct in a state where there is no external input by a finger or a stylus for example and conduct in a state where an external input is given. Also, the switch 30a may be formed in each picture element or only in necessary picture elements.

At least one of the electrodes coming in contact in the sensor structure is connected to the detection block 30 with a detection wire, thereby detecting potential changes and current values or time changes and the like resulted from the contact of two or more electrodes. In the present embodiment, before a period in which detecting driving is executed, at least one of the detection wires or detection electrodes is precharged with a known voltage.

[Another Example of Switch Structure]

Figure 3A:
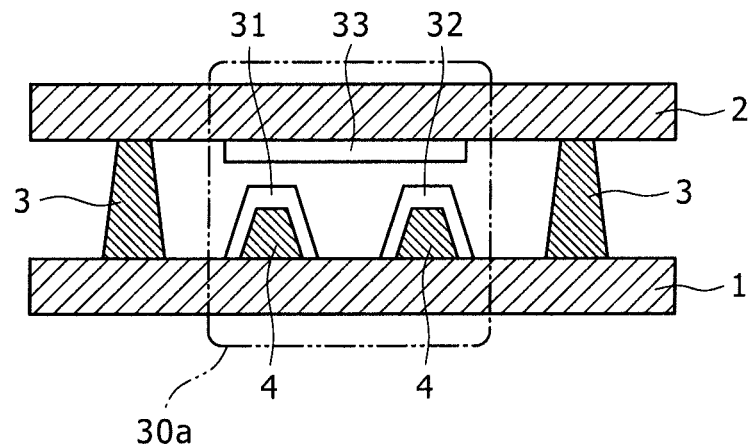
FIGS. 3A and 3B are schematic cross sections indicative of an example of another switch structure.
Figure 3B:
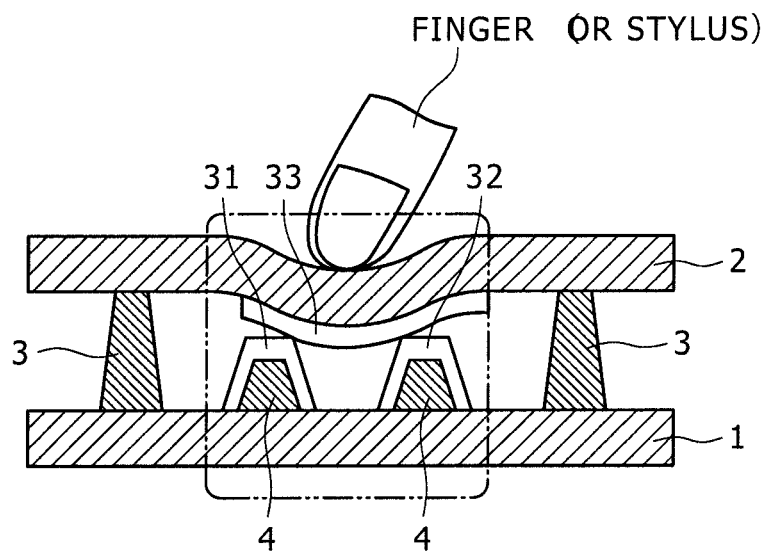

Referring to FIGS. 3A and 3B, there are shown schematic cross sections indicative of another example of switch structure. In the example shown in FIGS. 3A and 3B, a sensor structure (a switch 30a) is configured by three electrodes. To be more specific, in this sensor structure, two projections 4 lower than a spacer 3 are arranged on the side of a TFT substrate 1 and a detection electrode 31 and a detection electrode 32 are formed on these projections 4 by conductive layers. On the side of the counter substrate 2, a conductor pattern 33 formed by patterning is formed.

In the normal state, the switch 30a of the sensor structure is in the open state by the gap between two detection electrodes 31 and 32 on the side of the TFT substrate 1 and the conductor pattern 33 of the side of the counter substrate 2.

As shown in FIG. 3B, when an input is given (an external input) by a pressure externally applied with a finger or a stylus for example, the counter substrate 2 flexes by the pressure, thereby making both the conductor pattern 33 on the side of the counter substrate 2 come in contact with the two detection electrodes 31 and 32 on the side of the TFT substrate 1. This puts the switch 30a into a closed state.

In the present embodiment, any configuration is applicable if a switch structure is provided in which the two detection electrodes 31 and 32 are electrically closed by an external input.

[A Comparison Example (A Circuit Diagram of Structure Having Sensor)]

Figure 4:
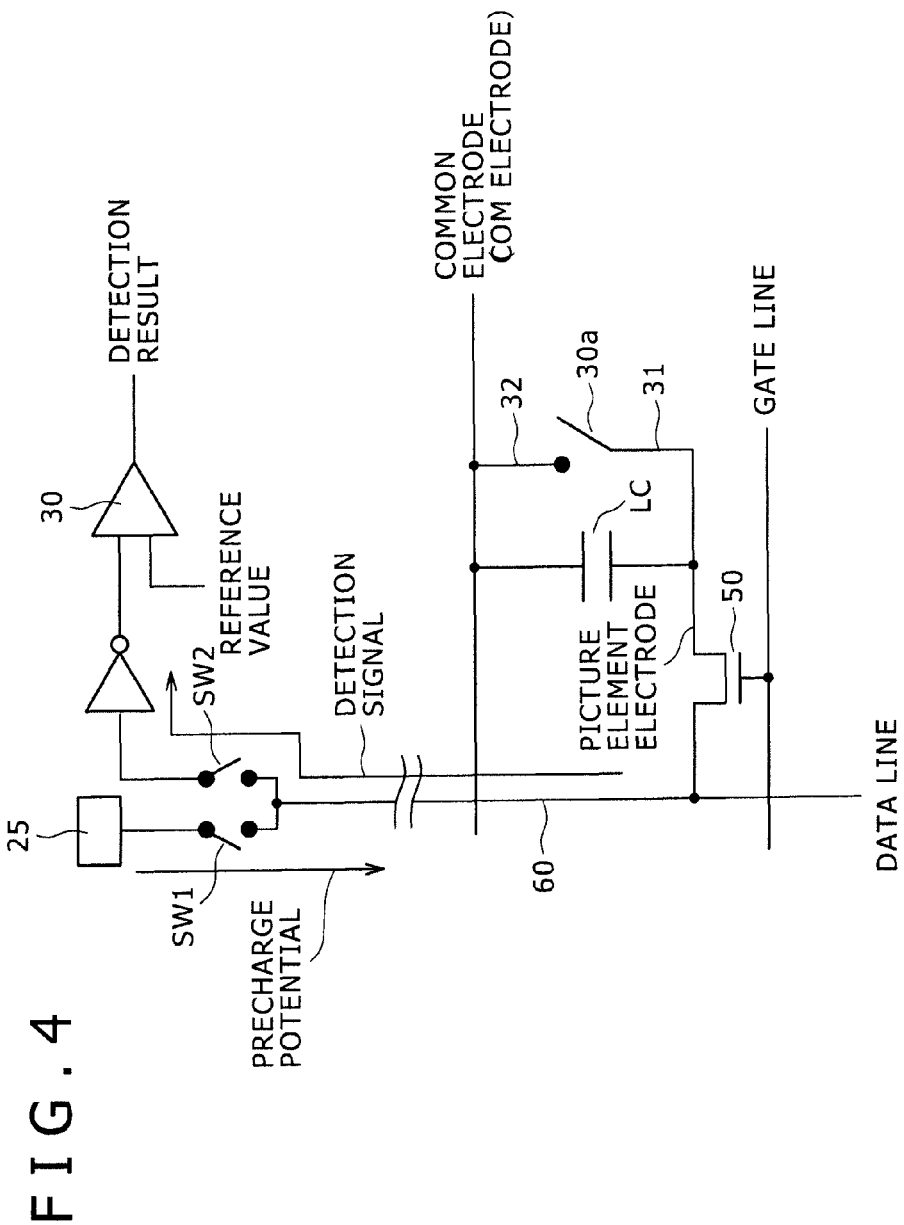
FIG. 4 is a circuit diagram corresponding to an exemplary comparison in the display apparatus of the present embodiment.

Referring to FIG. 4, there is shown a circuit diagram indicative of a comparison example in the display apparatus of the present embodiment. In a circuit configuration in this comparison example, the detection electrode 31 that comes in contact by an external input is shared by a picture element electrode and the detection electrode 32 is shared by a common electrode (COM) on the counter substrate. In addition, a detection wire 60 is shared by a data line that supplies a video signal to a select element (a drive transistor) 50 of a picture element on which the detection electrode 31 is arranged.

One end of the detection wire 60 on the side of the detection block 30 is branched into two, one being connected to a precharge block 25 via a switch SW1 while the other being connected to the detection block 30 via a switch SW2. When this switch SW1 is closed and the switch SW2 is opened, a precharge potential is supplied to the detection wire 60. On the other hand, when the switch SW2 is closed, the open/close state of the switch 30a of the sensor structure is detected in the detection block 30.

The detection block 30, based on a comparator for example, compares a detection signal received from the detection wire 60 with a predetermined reference value, outputting a detection result. If the detection result is indicative that the switch 30a is closed, then it indicates that the switch 30a is closed, which is indicative that the position of a picture element on which the switch 30a is arranged has been selected. The position determination block 40 shown in FIG. 1 determines a selection position on the display section 10 on the basis of the detection result of each switch 30a and the position of the picture element on which the switch 30a is arranged.

[A Method of Driving the Display Apparatus Associated with Comparison Example]

Figure 5:
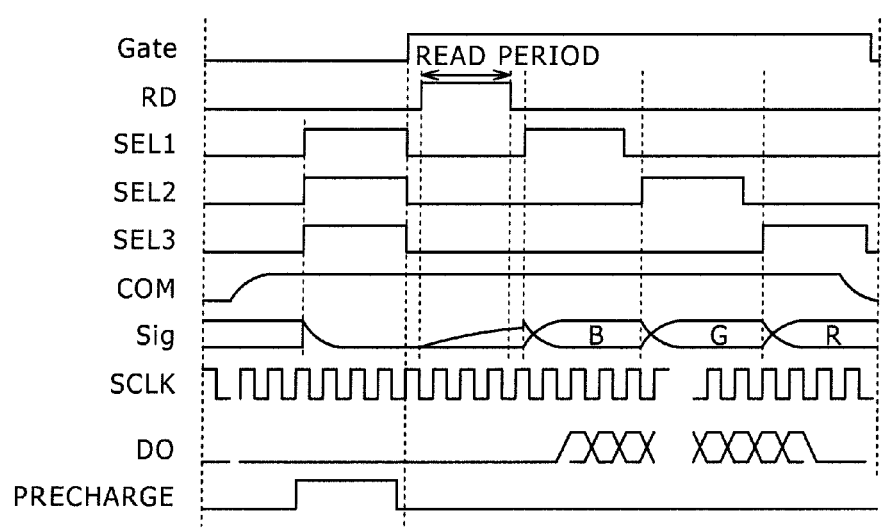
FIG. 5 is a timing chart indicative of a method of driving the display apparatus associated with the exemplary comparison.

Referring to FIG. 5, there is shown a timing chart indicative of a method of driving the display apparatus associated with the above-mentioned comparison example. This timing chart is indicative of a timing in one horizontal scan interval. "Gate" is indicative of a timing of driving the select element (the drive transistor) of each picture element along the horizontal direction, "RD" is indicative of a detection timing in the detection block, and "SEL1 through SEL3" are indicative of timings for driving selectors corresponding to B (Blue), G (Green), and R (Red).

"COM" is indicative of a timing of voltage application of the common electrode, "Sig" is indicative of a timing of each of R, G, and B video signals, "SCLK" is indicative of a clock, "DO" is indicative of a video data signal, and "Precharge" is indicative of a precharge to the wire (detection wire) conducting with one of the detection electrodes of the above-mentioned sensor structure (the switch).

In the timing shown in FIG. 5, when the select element (the drive transistor) is tuned on, a display voltage is written to a corresponding picture element electrode. At this moment, when the selectors SEL1 through SEL3 are sequentially turned on, the picture element corresponding to B (Blue), the picture element corresponding to G (Green), and the picture element corresponding to R (Red) are sequentially selected to write the corresponding video signal Sig.

In the comparison example, before the select element (the drive transistor) of the picture element arranged in the sensor structure is turned on, the data line (the detection wire) is precharged with a potential different from the COM potential, a potential (an XCOM potential) reverse in phase to the COM potential for example. Then, the data line (the detection wire) is put in a floating state and a detection period (an RD read period) is provided in the first half of the period in which the select element is on. The last half in which the select element is on provides a period in which the display voltage is written to the picture element electrode.

In this detection period, in order to detect a switch state of the sensor structure, the potential of one of the detection electrodes configuring the switch is used. To be more specific, if the two or more detection electrodes forming the switch is in contact with each other, the picture element electrode conducting with one detection electrode of the switch is in short with the counter common electrode (the COM electrode) and therefore, by keeping the detection wire floating, the COM potential is detected via the detection wire during the period in which the select element is on.

The detection of an input caused by an external pressure can be determined either by the reaching of the COM potential or the setting of a decision threshold value by use of a precharge potential.

It should be noted that the detection method based on the picture element electrode may involve at least two problems. One is that, when at least one detection electrode is in contact due to an external input, the picture element current always provides the potential of the other contact electrodes while this contact is on, thereby causing a trouble on a normal picture display operation. The other is that the picture element potential written to the picture element electrode in the previous timing affects the detection of the switch state, thereby making it possible to incur a detection error even if there is no external input.

In the former problem, there is no picture quality problem on the display picture element because of the existence of an external input element (a finger, a stylus, or the like) while an external input is being made. In the later problem, the precharge before detection provides an effective countermeasure.

To be more specific, precharging the detection wiring before detection can minimize the influence of the picture element potential in the previous timing, the influence of the potential remaining on the data line remains on the detection wire shared by the data line, thereby making it practicable to set a detection threshold value on the basis of the precharge potential.

Figure 6:
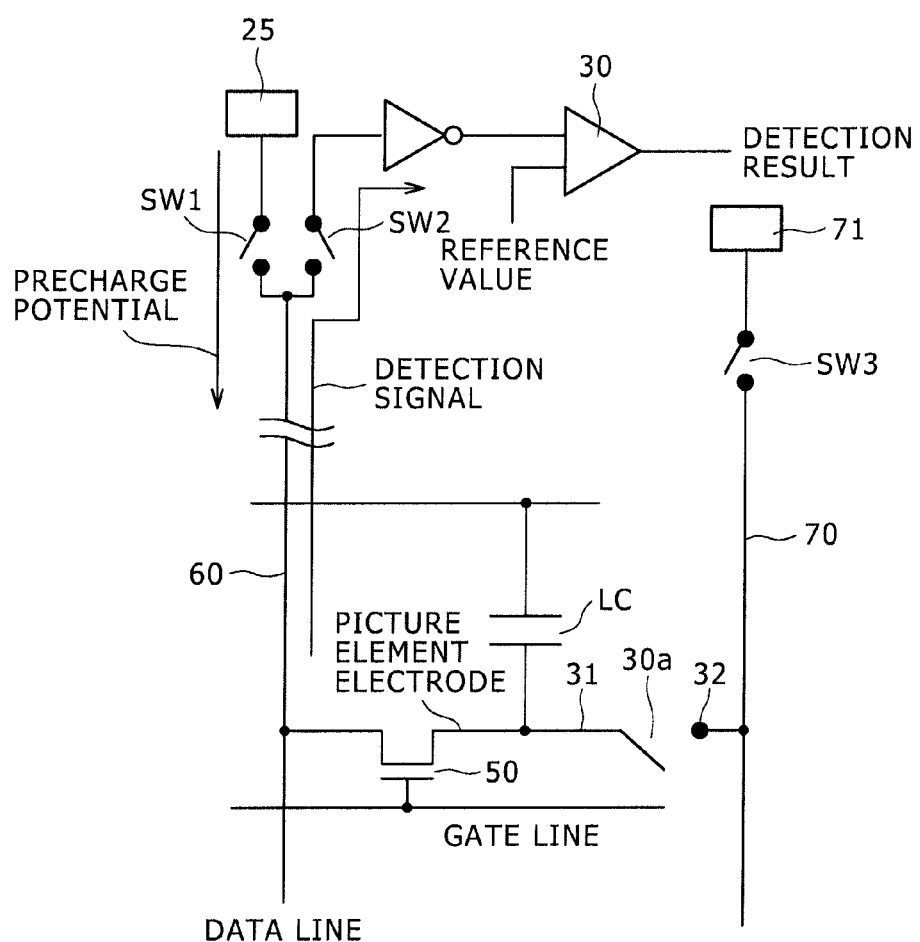
FIG. 6 is a circuit diagram indicative of a configuration having a detection potential supply block.

(2) The First Embodiment (a) A Configuration Having a Detection Block Potential Supply Block Referring to FIG. 6, there is shown a circuit diagram illustrating a block for supplying a potential for detection. In this circuit configuration, a select element (a drive transistor) 50 is arranged for driving picture elements for displaying video on the basis of a liquid crystal LC and a data line for supplying a video signal to the select element 50 is shared by a detection wire 60.

One end of the detection wire 60 on the side of a detection block 30 is branched into two, one being connected to a precharge block 25 via a switch SW1 while the other being connected to the detection block 30 via a switch SW2. When this switch W1 is closed and the switch W2 is opened, a precharge potential is supplied to the detection wire 60. On the other hand, when the switch SW1 is opened and the switch SW2 is closed, a detection signal is supplied to the detection block 30 from the detection wire 60, thereby detecting the open/close state of the switch 30a based on the comparison with a reference value.

The detection electrode 31 of the switch 30a that is closed by an external pressure is connected to the select element 50 and the detection electrode 32 of the switch 30a is connected to a detection wire 70. The detection wire 70 is connected to a detection potential supply block 71 via the switch SW3.

In the detection of the open/close state of the switch 30a by the detection block 30, the detection potential supply block 71 closes the switch detection block 30 to supply a detection potential to the detection wire 70. Consequently, when the switch 30a is closed in the detection timing, the detection potential supplied from the detection potential supply block 71 is given to the detection block 30 as a detection signal via the detection wire 70, the switch 30a, the select element 50, and the detection wire 60.

To be more specific, in the detection of the open/close state of the switch 30a, any potential can be supplied from the detection potential supply block 71 as a detection signal to be given to the detection block 30. In the comparison example shown in FIG. 4, the common potential (the COM potential) given from the common electrode (the COM electrode) is used as a detection signal, so that the potential of the detection signal is defined in a single uniform way. In contrast, in the present embodiment, the detection signal potential can be set as desired, so that the detection signal potential can be set lower than the common potential (the COM potential) to reduce the power dissipation.

[Timing Chart Indicative of a Driving Method]

Figure 7:
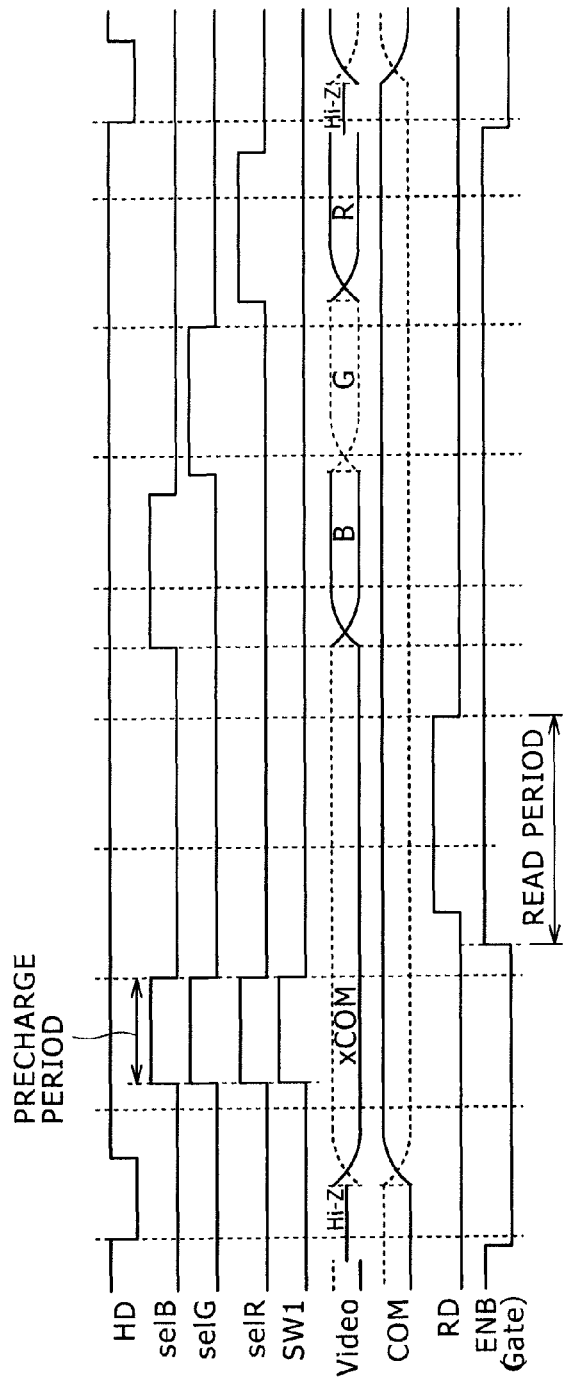
FIG. 7 is a timing chart indicative of a method of driving a display apparatus associated with a first embodiment (1) of the invention.

Referring to FIG. 7, there is shown a timing chart indicative of a method of driving a display apparatus associated with a first embodiment (1) of the invention. This timing chart is indicative of timings in one horizontal scan period. It should be noted that "HD" is indicative of a horizontal scan signal, "selB," "selG" and "selR" are indicative of timings of driving selectors corresponding to B, G, and R picture elements, and "SW1" is indicative of a driving timing of the switch SW1 that is conductive with the precharge block 25 (refer to FIG. 6). "Video" is indicative of a video signal timing, "COM" is indicative of a common potential timing, "RD" is indicative of a timing of switch detection by the detection block, and "ENB (Gate)" is indicative of a timing of driving a select element (a drive transistor) of picture elements along the horizontal direction.

In the timings shown in FIG. 7, when "Gate" of the select element (the drive transistor) is turned ON, a display voltage is written to the corresponding picture element electrode. At this moment, when "selB," "selG," and "selR" are sequentially turned ON, the picture element corresponding to B (Blue), the picture element corresponding to G (Green), and the picture element corresponding to R (Red) are sequentially selected to write the corresponding video signal "Video."

Further, in the present embodiment, before the select element (the drive transistor) of the picture element is turned ON, "selB," "selG," and "selR" are turned ON to precharge the data line (the detection wire) with a potential different from the COM potential, a potential (an XCOM potential) reverse in phase to the COM potential for example. Then, "selB," "selG," and "selR" are turned off to enter a floating state to provide a detection period (a read period) in the first half of a period in which the select element is ON.

In this detection period, a detection potential is supplied from the detection potential supply block 71 shown in FIG. 6 and the switch SW3 is closed (ON), thereby setting the potential of the detection wire 70 to the detection potential. At this moment, when the switch 30a arranged between the detection wire 70 and the select element 50 is closed by an external pressure, the detection potential given to the detection wire 70 is supplied to the data line via the select element 50. Then, when the switch SW1 is opened (OFF) and the switch SW2 is closed (ON), the detection potential given to the detection wire 60 shared by the data line is transmitted to the detection block 30 as a detection signal.

In the detection block 30, a comparison is made between the detection signal and the reference value. The reference value to be given to the detection block 30 is set between the precharge potential and the detection potential. Therefore, if the detection signal is the detection potential, the reference value is exceeded, thereby detecting that the switch 30a is closed.

On the other hand, if the switch 30a is not closed, the detection potential given to the detection wire 70 is not transmitted from the select element 50 to the data line (the detection wire 60). Namely, the detection signal remains to be the precharge potential and therefore does not exceed the reference value of the detection block 30, thereby detecting that the switch 30a is open.

Then, after the passing of the detection period, the last half of the period in which the select element is ON becomes a period in which a display voltage is written to the picture element electrode.

In the present embodiment, in the detection of the open/close state of the switch 30a, any potential can be given from the detection potential supply block 71 as a detection signal to be supplied to the detection block 30. Therefore, lowering the potential of the detection signal below the common potential allows the reduction of the power dissipation as compared with the comparison example (the detection signal providing the common electrode (the COM electrode)) as shown in FIG. 4.

It should be noted that, for the detection potential to be set by the detection potential supply block 71, a potential different from the precharge voltage to be given from the precharge block 25 is supplied. This makes valid the detection of open/close state of the switch 30a. In addition, reducing the absolute value of the potential as compared with the precharge potential allows the reduction of the power dissipation.

On the other hand, the detection potential to be set by the detection potential supply block 71 can be set to a same level as that of the precharge potential to be given from the precharge block 25. When the detection potential becomes the same as the precharge potential (the same potential), the same potential as the precharge potential is given as a detection signal regardless of the open/close state of the switch 30a. Consequently, the potential (the same potential as the precharge potential) of a detection signal will not exceed the reference value of the detection block 30 regardless the open/close state of the switch 30a, thereby resulting in the same detection as obtained when the switch 30a is open.

Namely, the detection of open/close state of the switch 30a can be invalidated (or non-reacting) by the above-mentioned setting. For example, a conductive foreign material can attach to the switch 30a due to a display apparatus manufacturing process or the like, thereby putting the switch 30a in a normally closed (ON) state. If this happens, the detection of open/close state of the switch 30a can be invalidated by setting the detection potential to the precharge potential only on that normally closed portion as a calibration before shipment from factory.

If there is any error operation portion, a circuit drive operation is executed in the detection block 30 for detecting the open/close state of the switch 30a although there is no input. Preventing this circuit operation from occurring can lower the power dissipation.

Depending applications, it can be wanted that the switch 30a is validated on only a certain portion (for example, a button display portion such as an icon) of the display block and the other portions are left non-reacting. Such a configuration can be attained by invalidating the switch 30a of the portion to be made non-reacting by setting the detection potential of that portion to the precharge potential.

Consequently, if an external input is made, the above-mentioned reduced power dissipation can be attained because the detection of the switch 30a is not executed in other portions than a portion that reacts such as a button for example.

Also, changing the precharge potential to be given from the precharge block 25 (refer to FIG. 6) allows the reduction of charge and discharge currents by the comparison with the reference value through a comparator that is the detection block 30, thereby reducing the power dissipation.

(b) Configuration for Giving Common Potential to the Detection Block

Figure 8:
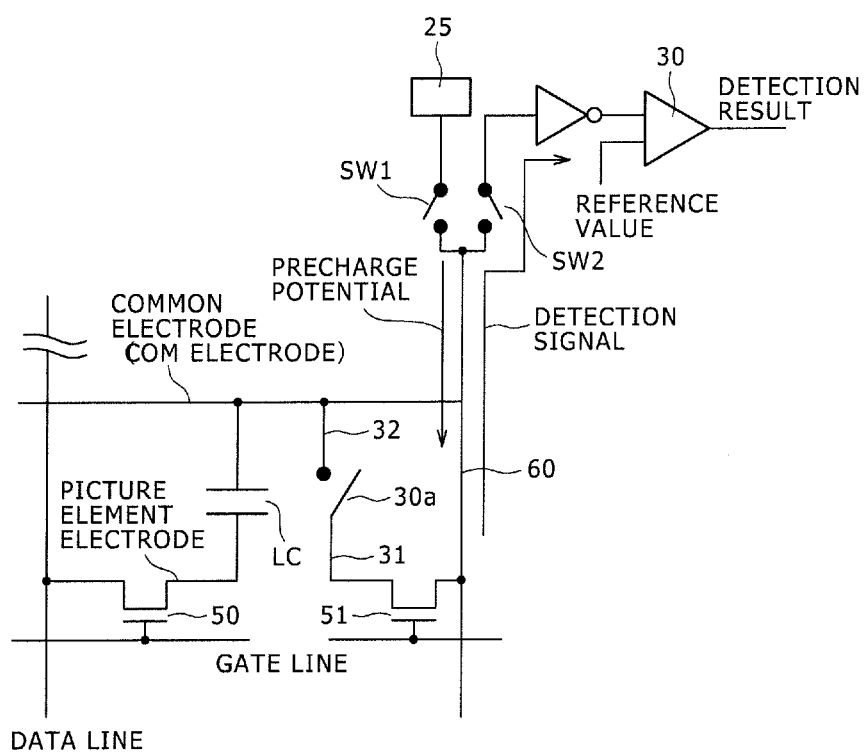
FIG. 8 is a circuit diagram indicative of a configuration for giving a common potential to a detection block.

Referring to FIG. 8, there is shown a circuit diagram illustrating a configuration in which a common potential is given to a detection block. In the configuration shown in FIG. 8, a select switch (a drive transistor) 50 is arranged at each intersection between a gate line and a data line, thereby controlling the driving of each picture element of a liquid crystal cell. A switch 30a is arranged between a common electrode (a COM electrode) and a detection wire 60. A detection electrode 31 if the switch 30a is connected the detection wire 60 via a transistor 51 that is controlled by the gate line and a detection electrode 32 of the switch 30a is connected to the common electrode.

In this example, the detection wire 60 and the data line are separately arranged. One end of the detection wire 60 is branched into two, one being connected to a precharge block 25 via a switch SW1 and the other being connected to a detection block 30 via a switch SW2. When this switch SW1 is closed and the switch SW2 is opened, a precharge potential is given to the detection wire. On the other hand, when the switch SW1 is opened and the switch SW2 is closed, a switch state of the sensor structure can be detected in the detection block 30.

In the above-mentioned configuration, the stable reading can be realized in the same way as described above by precharging the detection wire 60 before detection regardless of the synchronization or non-synchronization with the write timing of a video signal to the liquid crystal cell.

[Timing Chart Indicative of a Driving Method]

Figure 9:
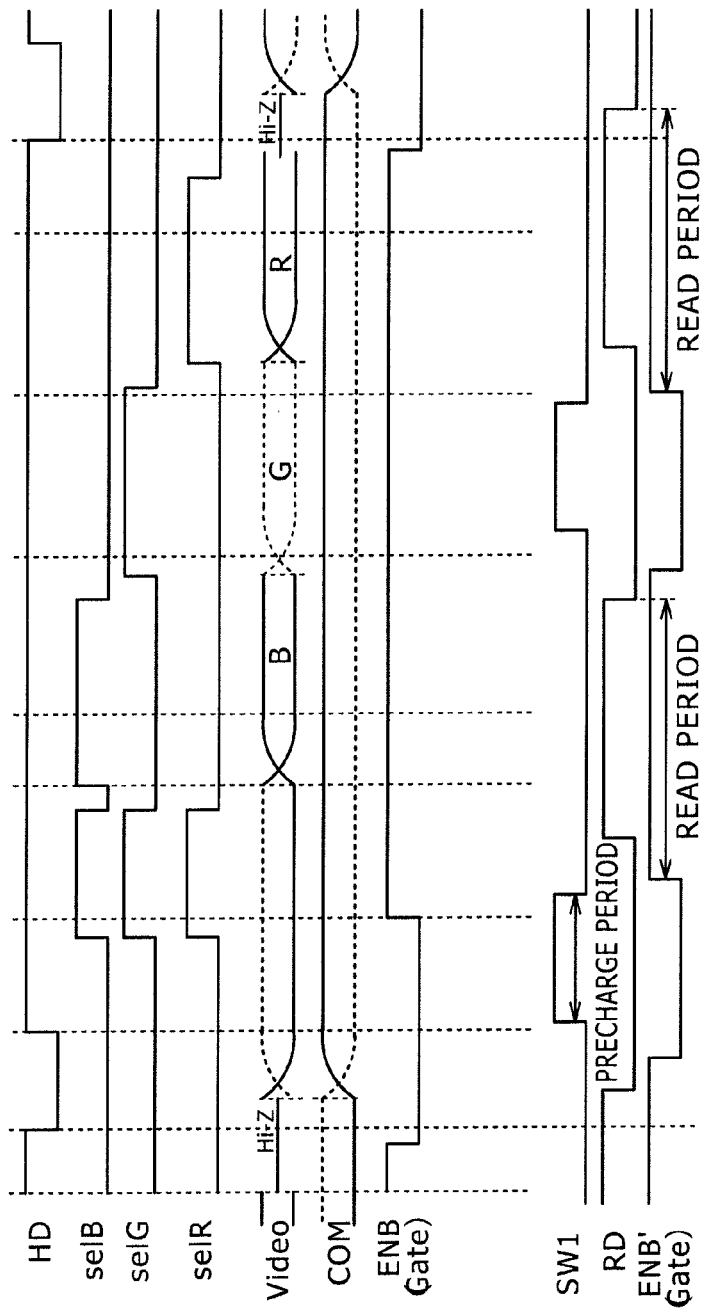
FIG. 9 is a timing chart indicative of a method of driving a display apparatus associated with the first embodiment (2)

Referring to FIG. 9, there is shown a timing chart indicative of a method of driving a display apparatus associated with the first embodiment (2) of the invention. This timing chart is indicative of timings in one horizontal scan period. It should be noted that "HD" is indicative of a horizontal scan signal, "selB," "selG" and "selR" are indicative of timings of driving selectors corresponding to B, G, and R picture elements, and "SW1" is indicative of a driving timing of the switch SW1 that is conductive with the precharge block 25 (refer to FIG. 8). "Video" is indicative of a video signal timing, "COM" is indicative of a common potential timing, "RD" is indicative of a timing of switch detection by the detection block, "ENB (Gate)" is indicative of a timing of driving a select element (a drive transistor) of picture elements along the horizontal direction, and "ENB' (Gate)" is indicative of a drive timing of the transistor 51 (refer to FIG. 8).

In the timings shown in FIG. 9, when "Gate" of the select element (the drive transistor) is turned ON, a display voltage is written to the corresponding picture element electrode. At this moment, when "selB," "selG," and "selR" are sequentially turned ON, the picture element corresponding to B (Blue), the picture element corresponding to G (Green), and the picture element corresponding to R (Red) are sequentially selected to write the corresponding video signal "Video."

In the present embodiment, a precharge period is provided in which a precharge voltage is given to the detection wire 60 while the transistor 51 is not operating. In the precharge period, the switch SW1 shown in FIG. 8 is closed (ON), the switch SW2 is opened (OFF), thereby giving the precharge voltage from the precharge block 25 to the detection wire 60.

Then, the transistor 51 is turned ON to provide a detection period (a read period). In this detection period, the switch SW1 shown in FIG. 8 is opened (OFF) and the switch SW2 is closed (ON) to transmit a common potential (a COM potential) given to the detection wire 60 to the detection block 30 as a detection signal.

In the detection block 30, a comparison is made between a detection signal and a reference value. The reference value given to the detection block 30 is set between the precharge potential and the common potential. Therefore, if the detection signal is the common potential, the reference value is exceeded, thereby detecting that the switch 30a is closed.

On the other hand, if the switch 30a is not closed, the detection signal remains to be the precharge potential not to exceed the reference value of the detection block 30, thereby detecting that the switch 30a is open.

As described above, in the present embodiment, the writing of a video signal to picture elements and the precharging and switch 30a detecting operation can be separated from each other. This eliminates the necessity for executing a switch 30a detecting operation with the video signal write timing, thereby enabling the setting of the detecting operation timing as desired to suppress the occurrence of a wait time. In the timing chart shown in FIG. 9, two detecting operations are executed in one horizontal scan period. Consequently, the above-mentioned configuration can increase the processing speed of each detecting operation and lower the processing speed to enter a standby mode or a full pause state, thereby saving the power dissipation.

(3) The Second Embodiment

[A Configuration in Which a Switch is Arranged between Select Elements]

Figure 10:
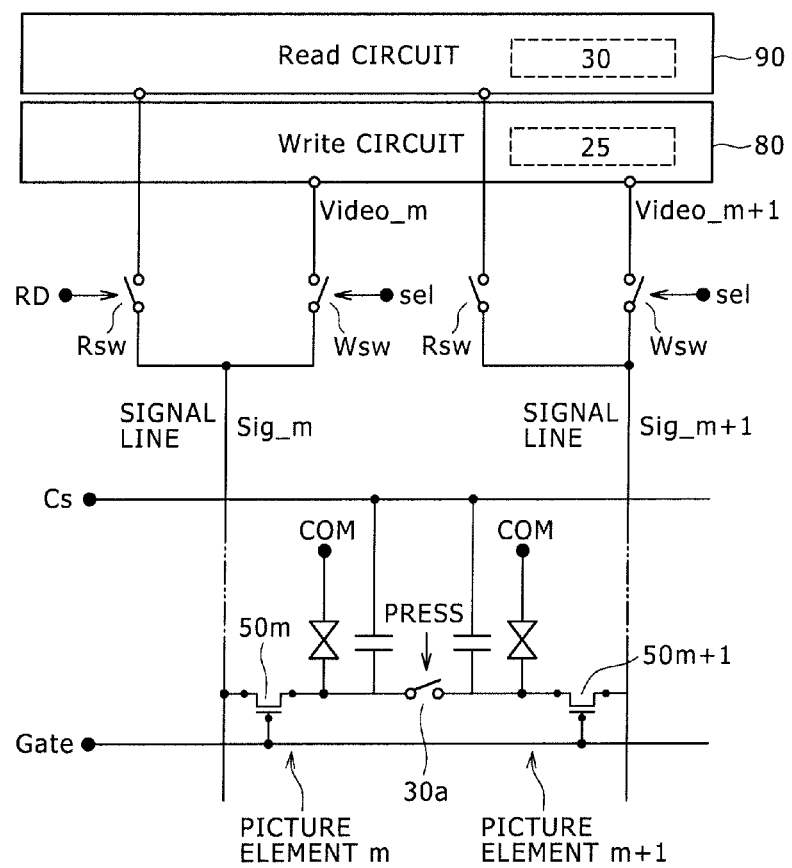
FIG. 10 is a circuit diagram illustrating a configuration in which a switch is arranged between select elements.

Referring to FIG. 10, there is shown a circuit diagram illustrating a configuration in which a switch is arranged between select elements. In this circuit configuration, a switch 30a that is closed by an external pressure is arranged between a select element (a drive transistor) 50m arranged on a picture element m and a select element (a drive transistor) 50m+1 arranged on a picture element m+1. Here, the switch 30a is arranged between the select elements 50m and 50m+1 of the adjacent picture elements m and m+1; however, the picture elements m and m+1 need not always be adjacent with each other. For example, these picture elements can be separate from each other by several picture elements or diagonally adjacent with each other.

The signal line Sig of each picture element is connected with a write 80 and a read circuit 90. The write circuit 80 writes a video signal to the signal line Sig and has a precharge block 25. The read circuit 90 reads, from the signal line Sig, a detection signal for detecting an open/close state of the switch 30a and passes the detection signal to a detection block 30.

In the present embodiment, the signal line Sig of each picture element executes both the writing of a video signal and the transmission of a detection signal of the switch 30a, so that the signal line Sig is branched halfway into the write circuit 80 and the read circuit 90. In addition, a selector switch Wsw is arranged halfway on the branch line to the write circuit 80 and a read switch Rsw is arranged halfway on the branch line to the read circuit 90.

The switch 30a arranged between picture elements is arranged between the source (or the drain) of the select element 50m of the picture element m and the source (or the drain) of the select element 50m+1 of the picture element m+1. In order to configure the switch 30a as described above, detection electrodes 31 and 32 arranged on a TFT substrate 1 are conducted with the sources (or the drains) of the select elements 50m and 50m+1 respectively, thereby providing conduction between the detection electrodes 31 and 32 via a conductor pattern 33 arranged on a counter substrate 2 as shown in FIGS. 3A and 3B for example.

The circuit configuration described above allows the picture elements m and m+1 with the switch 30a arranged therebetween to use, as a detection signal, the precharge potential transmitted from signal lines Sigm+1 and Sigm of each picture element. Consequently, the detection density of the switch 30a can be reduced in a pseudo manner, thereby reducing the power dissipation.

[Timing Chart Indicative of a Driving Method]

Figure 11:
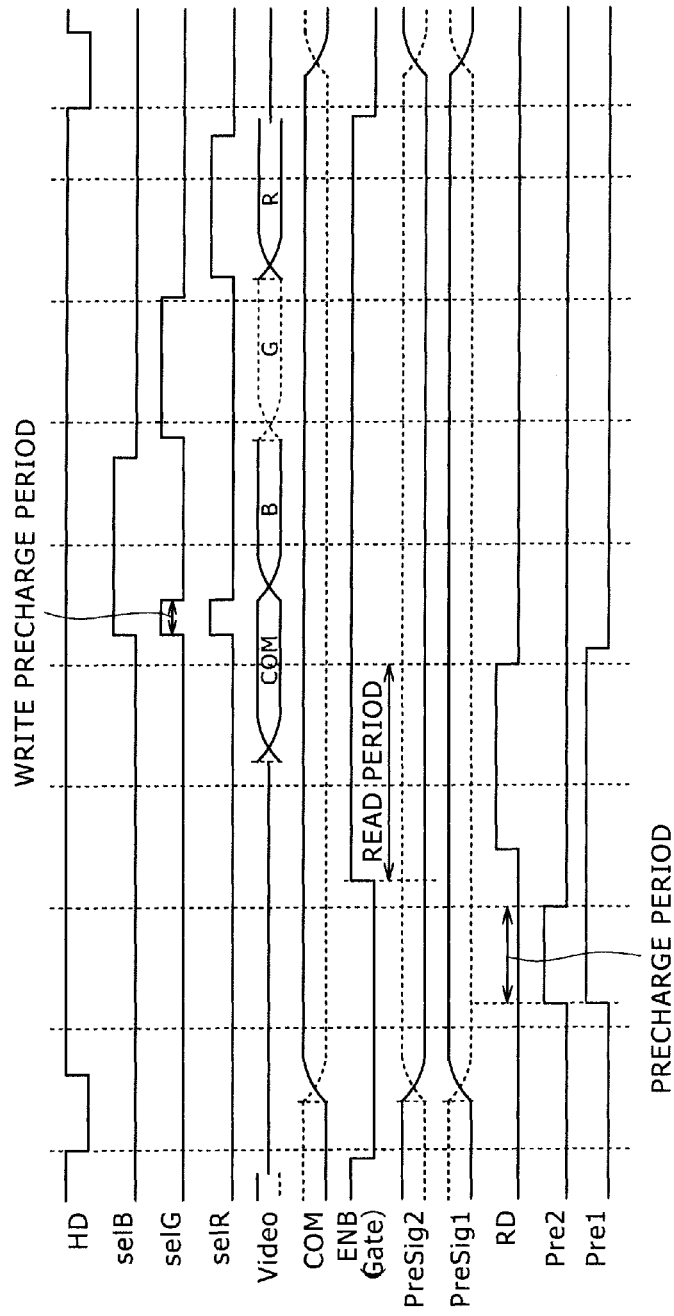
FIG. 11 is a timing chart indicative of a method of driving a display apparatus associated with a second embodiment of the invention.

Referring to FIG. 11, there is shown a timing chart indicative of a method of driving a display apparatus associated with the second embodiment. This timing chart is indicative of timings in one horizontal scan period. It should be noted that "HD" is indicative of a horizontal scan signal, "selB," "selG" and "selR" are indicative of timings of driving selectors corresponding to B, G, and R picture elements, and "Video" is indicative of a video signal timing. "COM" is indicative of a common potential timing, and "ENB (Gate)" is indicative of a timing of driving a select element (a drive transistor) of picture elements along the horizontal direction. "PreSig1" and "PreSig2" are indicative of precharge potentials to be given to the signal lines of two picture elements connected by a switch. "RD" is indicative of a timing of switch detection by the detection block. "Pre1" and "Pre2" are indicative of drive timings of selector switches Wsw that are conducting with the write circuit 80 (refer to FIG. 10).

In the timings shown in FIG. 11, when "Gate" of the select element (the drive transistor) is turned ON, a display voltage is written to the corresponding picture element electrode. At this moment, when "selB," "selG," and "selR" are sequentially turned ON, the picture element corresponding to B (Blue), the picture element corresponding to G (Green), and the picture element corresponding to R (Red) are sequentially selected to write the corresponding video signal "Video."

In the present embodiment, before the picture element select element (the drive transistor) is turned ON, a precharge potential is given from the write circuit 80 to each signal line Sig of the two picture elements connected by the switch 30a. Namely, the selector switch Wsw arranged on each branch of the signal lines Sigm and Sigm+1 is closed and the read switch Rsw is opened. Then, the precharge potential is given from the precharge block 25 of the write circuit 80 to each of signal lines Sigm and Sigm+1. Here, each of the precharge potentials to be given to the signal lines Sigm and Sigm+1 is inverted in polarity.

Then, a detection period (a read period) is arranged in the first half of the period in which the select element is ON. In this detection period, of the switches Wsw shown in FIG. 10, the selector switch Wsw of one picture element (for example, the picture element m) is closed, the read switch Rsw is opened and the selector switch Wsw of other picture element (for example, the picture element m+1) is opened, and the read switch Rsw is closed. Namely, the signal line Sigm of the picture element m is applied with a precharge potential.

If, in the above-mentioned state, the switch 30a between the picture elements is closed by an external pressure, the precharge potential applied to the signal line Sigm of the picture element m is transmitted from the select element 50m to the signal line m+1 of the picture element m+1 via the switch 30a and the select element 50m+1 to be then transmitted to the detection block 30 of the read circuit 90 as a detection signal.

In the detection block 30 of the read circuit 90, a comparison is made between the detection signal and the reference value. Namely, in obtaining a detection signal from the signal line Sigm+1 of the picture element m+1, a comparison is made between a precharge potential (a first precharge potential) applied to the signal line Sigm of the picture element m and the reference value. If the detection signal is in excess of the reference value, the closing of the switch 30a is detected.

On the other hand, if the switch 30a is not closed, the detection signal is left to be a precharge potential (a second precharge potential reverse in polarity to the first precharge potential) applied to the picture element m+1, not exceeding the reference value of the detection block 30, thereby detecting that the switch 30a is open.

In the detection period (the read period) in the next one horizontal scan period, a second precharge potential applied to the signal line Sigm+1 of the picture element m+1 is detected by the signal line Sigm of the picture element m as a detection signal, thereby detecting that the switch 30a is closed. Namely, for each horizontal scan period, the signal line and the detection signal that are subject to the detection in the detection block 30 are alternated.

In the present embodiment, when the first precharge potential and the second precharge potential are inverted every horizontal scan period, the switch 30a is closed to fix the detection signal (the precharge potential) to be entered in the detection block 30. Consequently, if a comparator that is the detection block 30 is used, the comparing operation between the detection signal and the reference value makes unnecessary the reference value switching operation. As a result, the charge/discharge current involved in the reference value switching operation can be reduced, thereby leading to the reduced power dissipation. Further, when the first precharge potential and the second precharge potential are temporarily made equal, the same detection signal (the same precharge potential) is entered in the detection block 30 regardless of the open/close state of the switch 30a, thereby invalidating the switch 30a detecting operation. Consequently, the detection density of the switch 30a can be reduced in a pseudo manner, thereby reducing the power dissipation. Also, changing the precharge potential to be given from the precharge block 25 (refer to FIG. 10) allows the reduction in the power dissipation.

It should be noted that the circuit configuration shown in FIG. 10 shows an example in which the signal line Sig is shared by the wiring for detecting a detection signal; it is also practicable to arrange an independent detection wire in accordance with the circuit configuration shown in FIG. 8.

(4) The Third Embodiment
[A Configuration in Which a Switch is Arranged for Every Other Picture Element]

Figure 12:
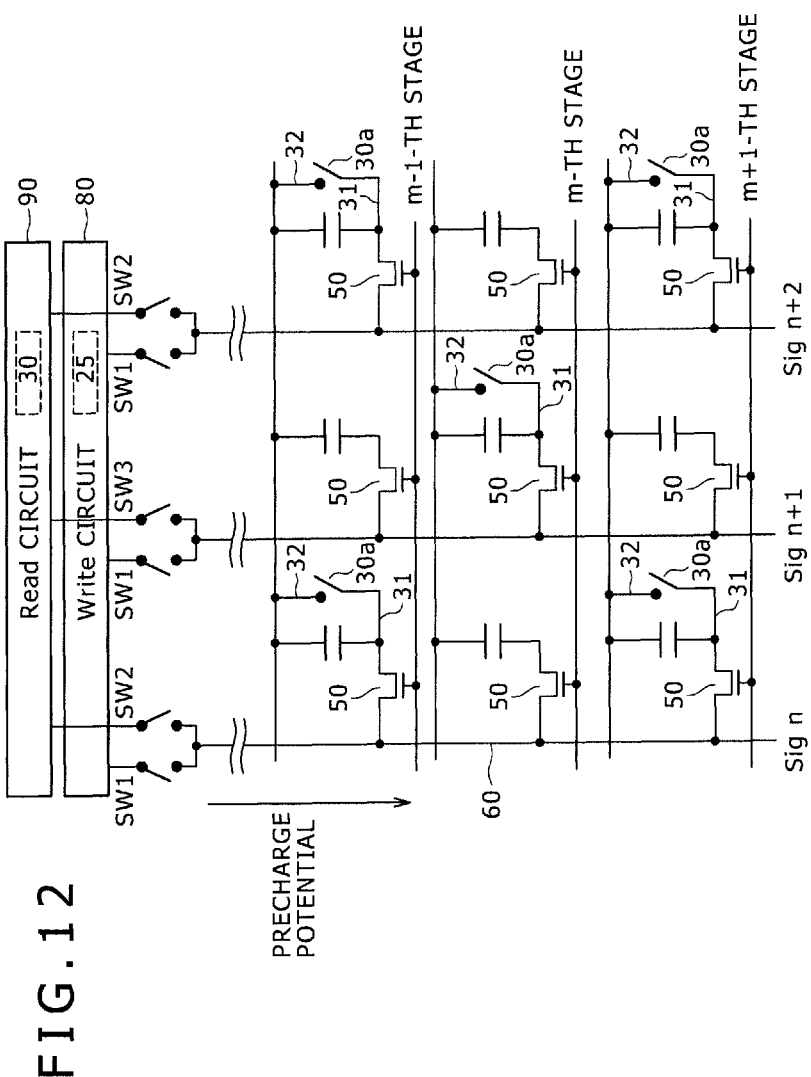
FIG. 12 is a circuit diagram illustrating a configuration in which a switch is arranged for every other picture element.

Referring to FIG. 12, there is shown a circuit diagram illustrating a configuration in which a switch is arranged for every other picture element. In this circuit configuration, the switch 30a is arranged every other picture element in the vertical direction and the horizontal direction for a plurality of picture elements arranged in a matrix.

With the switch 30a, a detection electrode 31 that comes in contact by an external input is shared by a picture element electrode and a detection electrode 32 is shared by a common electrode (a COM electrode) on the counter substrate. A detection wire 60 is shared by a data line for giving a video signal to a select element 50 (a drive transistor) of a picture element on which the detection electrode 31 is arranged.

A signal line Sig of each picture element is connected with a write circuit 80 and a read circuit 90. The write circuit 80 writes a video signal to the signal line Sig and has a precharge block 25. The read circuit 90 reads a detection signal for detecting an open/close state of the switch 30a from the signal line Sig and passes the detection signal to a detection block 30.

One end of the detection wire 60 on the side of detection block 30 is branched into two, one being connected to the precharge block 25 via a switch SW1 and the other being connected to detection block 30 via a switch SW2 (or a switch SW3). A precharge potential is supplied to the detection wire 60 with the switch SW1 closed and the switches SW2 and SW3 opened. On the other hand, with the switch SW1 opened and the switches SW2 and SW3 closed, an open/close state of the switch 30a of the sensor structure is detected by the detection block 30. Here, with the switches SW2 and SW3, the subjects of an open/close operation are selected alternately in every horizontal scan period by a selection block not shown.

In the above-mentioned circuit configuration, with a display apparatus on which a common potential to be applied to a common electrode of a picture element is inverted in every horizontal scan period, a detection signal (a common potential) in the detection block 30 is detected when the same potential is applied. Therefore, the detection block 30 executes a detecting operation based on a comparison between the common potential always having the same polarity and the reference value, which eliminates the reference value switching, thereby reducing the power dissipation.

[Timing Chart Indicative of a Driving Method]

Figure 13:
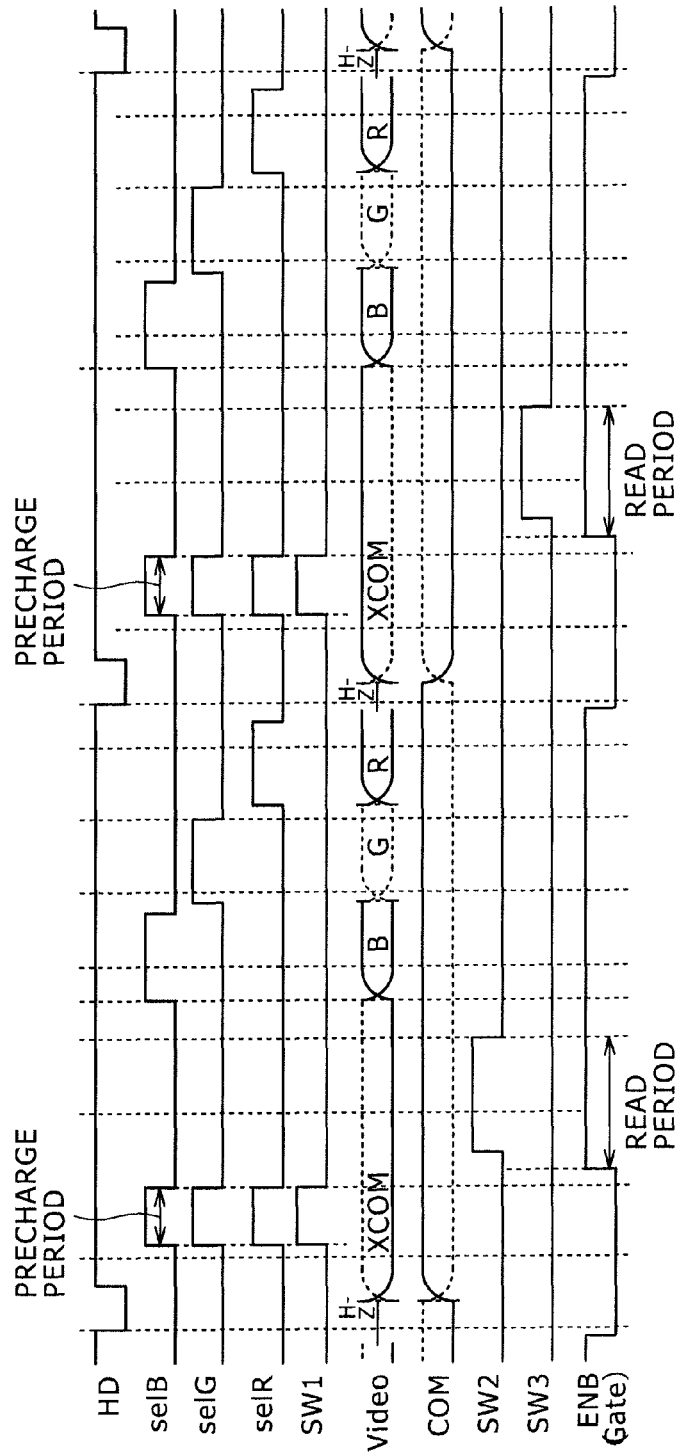
FIG. 13 is a timing chart indicative of a method of driving a display apparatus based on the configuration in which a switch is arranged for every other picture element.

Referring to FIG. 13 there is shown a timing chart indicative of a method of driving a display apparatus having configuration in which a switch is arranged every other picture element. This timing chart is indicative of timings in two horizontal scan periods. It should be noted that "HD" is indicative of a horizontal scan signal, "selB," "selG" and "selR" are indicative of timings of driving selectors corresponding to B, G, and R picture elements, and "SW1" is indicative of a drive timing of the switch SW1 conducting with the precharge block 25 of the write circuit 80 (refer to FIG. 12). "Video" is indicative of a video signal timing, "COM" is indicative of a common potential timing, "Switch W2" and "Switch W3" are indicative of drive timings of the switch SW2 and switch SW3 conducting with the detection block 30 of the read circuit 90, and "ENB (Gate)" is indicative of a drive timing of a select element (a drive transistor) of picture elements along the horizontal direction.

In the timings shown in FIG. 13, when "Gate" of the select element (the drive transistor) is turned ON, a display voltage is written to the corresponding picture element electrode. At this moment, when "selB," "selG," and "selR" are sequentially turned ON, the picture element corresponding to B (Blue), the picture element corresponding to G (Green), and the picture element corresponding to R (Red) are sequentially selected to write the corresponding video signal "Video."

Further, in the present embodiment, in the first one horizontal scan period, "selB," "selG" and "selR" are turned ON before the select element (the drive transistor) of the picture element is turned ON, thereby precharging the signal line (the detection wire) with a potential different from the COM potential, namely, a potential (an XCOM potential) reverse in polarity to the COM potential for example. Then, "selB," "selG" and "selR" are turned OFF to put the signal line (the detection wire) into a float state, thereby providing a detection period (a read period) in the first half of the period in which the select element is ON.

In this detection period, when the switch SW1 is opened (OFF), the switch SW2 is closed (ON), and the switch SW3 is opened (OFF), signal lines Sign, Sign+2, and so on of every other picture element come to conducting with the detection block 30 of the read circuit 90.

In this state, when the switch 30a is closed by an external pressure, a COM potential is given to signal lines Sign, Sign+2, and so on to be transmitted to the detection block 30 of the read circuit 90 as a detection signal.

In the detection block 30, a comparison is made between the detection signal and the reference value. The reference value to be given to the detection block 30 is set between the COM potential and the XCOM potential. Therefore, if the detection signal is the COM potential, the detection signal exceeds the reference value, thereby detecting that the switch 30a is closed.

On the other hand, if the switch 30a is not closed, the detection signal to be given to the detection block 30 is the precharge potential, namely, the XCOM potential, and therefore the reference value of the detection block 30 is not exceeded, thereby detecting that the switch 30a is open.

In the next one horizontal scan period, "selB," "selG" and "selR" are turned ON before the select element (the drive transistor) of the picture element is turned ON and the signal line (the detection wire) is precharged with a potential different from the COM potential, namely, a potential (an XCOM potential) reverse in polarity to the COM potential for example. Then, "selB," "selG" and "selR" are turned OFF to put the signal line (the detection wire) into a float state, thereby providing a detection period (a read period) in the first half of the period in which the select element is ON.

In this detection period, when the switch SW1 is opened (OFF), the switch SW2 is opened (OFF), and the switch SW3 is closed (ON), signal lines Sign+1, Sign+3, and so on of every other picture element come to conducting with the detection block 30 of the read circuit 90.

In this state, when the switch 30a is closed by an external pressure, a COM potential is given to signal lines Sign+1, Sign+3, and so on to be transmitted to the detection block 30 of the read circuit 90 as a detection signal.

In the detection block 30, a comparison is made between the detection signal and the reference value. The reference value to be given to the detection block 30 is set between the COM potential and the XCOM potential. Therefore, if the detection signal is the COM potential, the detection signal exceeds the reference value, thereby detecting that the switch 30a is closed.

On the other hand, if the switch 30a is not closed, the detection signal to be given to the detection block 30 is the precharge potential, namely, the XCOM potential, and therefore the reference value of the detection block 30 is not exceeded, thereby detecting that the switch 30a is open.

Based on the above-mentioned timings, a state is provided in which the switch 30a that is the subject of detection in every horizontal scan period is alternated every other picture element vertically and horizontally. To be more specific, when the switch SW2 is closed (ON), the switches 30a on row m−1, row m+1, and odd-numbered columns (column n, column n+2) are detected; when the switch SW3 is closed (ON), the switches 30a on row m, row m+2, and odd-numbered columns (column n+1, column n+3) are detected.

Consequently, in the case of a display apparatus having a mode in which the common potential (the COM potential) is inverted in one horizontal scan period, for example, the COM potential at the time when the switch SW2 is turned ON is bipolar and the COM potential at the time when the switch SW3 is turned ON is also bipolar. Therefore, the read potentials to the signal lines Sig can be made equal (the detection signal potential=the precharge potential).

Namely, if a comparator is used for the detection block 30 for detecting an open/close state of the switch 30a, the precharge potential to each signal line Sig does not fluctuate, resulting in the reduction in power dissipation.

This holds true with the case in which the read circuit 90 is provided in parallel and the open/close timings of the switch SW2 and switch SW3 are the same. In addition, fixing the precharge potential to be given from the precharge block 25 (refer to FIG. 12) relative to the switch 30a for a certain period can reduce the charge/discharge current by a comparison with the reference value through a comparator that is the detection block 30, thereby reducing the power dissipation.

While preferred embodiments of the present invention have been described using specific terms, such description is for illustrative purpose, and it is to be understood that changes and variations can be made without departing from the spirit or scope of the following claims.

(5) Electronic Devices

[Examples of Module Configurations and Application Examples]

Figure 14:
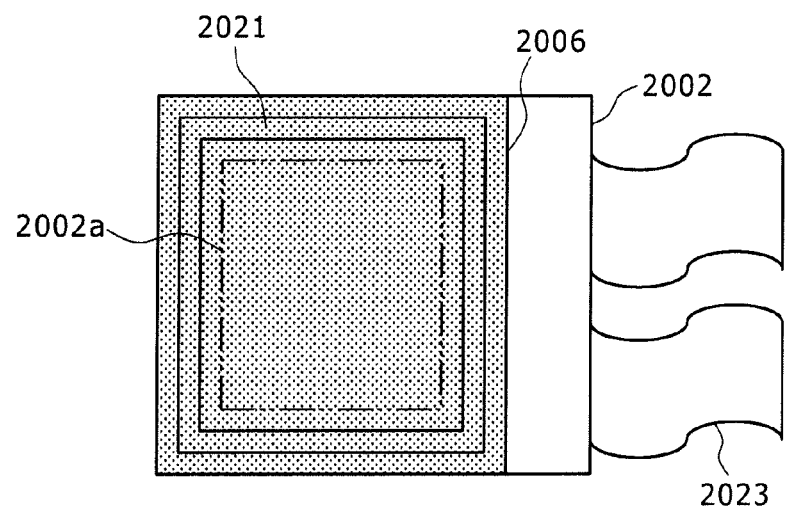
FIG. 14 is a schematic diagram illustrating an example of a flat module shape.

The display apparatus associated with the embodiments of the present invention includes a flat-type apparatus having a modular shape as shown in FIG. 14. For example, a picture element array block 2002a on which a liquid crystal element, a thin-film transistor, a thin-film capacitor, a photodetector, and so on are integrally formed in a matrix is arranged on an insular substrate 2002. An adhesive 2021 is arranged around this picture element array block (the picture element matrix block) 2002a, on which a counter substrate 2006 based on glass for example is attached, thereby providing a display module. This transparent counter substrate 2006 can have a color filter, a protective film, or a light-blocking film, for example, as required. The display module can an FPC (Flexible Printed Circuit) for example as a connector for inputting signals for example from the outside into the picture element array block 2002a and outputting therefrom to the outside.

[Application Examples]

The display apparatus associated with embodiments of the present invention is applicable to various electronic devices as shown in FIG. 15 through FIGS. 19A to 19G, namely, a digital camera, a note-type personal computer, a portable terminal apparatus such as a mobile telephone, a video camera, and all other types of devices that are configured to display a video signal entered in these devices and a video signal generated in these devices, for example. The following describes examples of electronic devices to which the embodiments of the present invention are applied.

Figure 15:
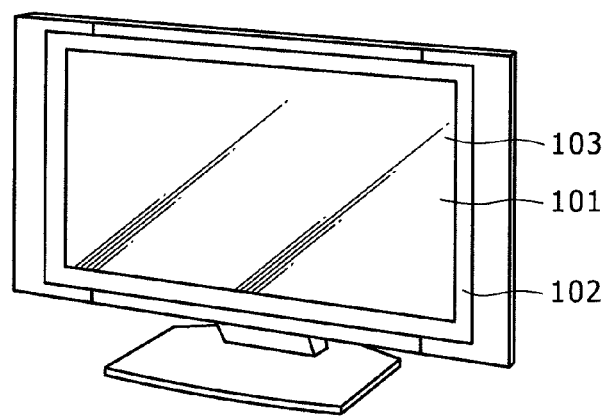
FIG. 15 is a perspective view of a television receiver to which the present embodiment is applied.

Referring to FIG. 15, there is shown a perspective view of a television receiver to which an embodiment of the present invention is applied. The television receiver associated with the present invention has a video display screen block 101 configured by a front panel 102, a filter glass 103, and so on and is manufactured by use of the display apparatus associated with the present invention as the video display screen block 101.

Figure 16A:
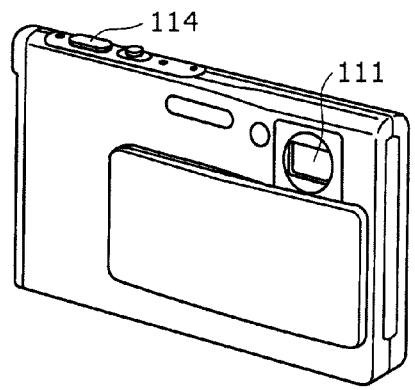
FIGS. 16A and 16B are perspective views of a digital camera to which the present embodiment is applied.
Figure 16B:
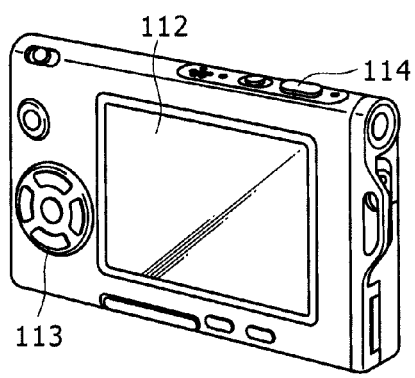

Referring to FIGS. 16A and 16B, there is shown a perspective view of a digital camera to which an embodiment of the present invention is applied. FIG. 16A shows a perspective view of the front side. FIG. 16B shows a perspective view of the rear side. The digital camera associated with the present application example has a light-emitting block 111 for flash, a display block 112, a menu switch 113, and a shutter button 114, for example, and is manufactured by use of the display apparatus associated with present embodiment as the display block 112.

Figure 17:
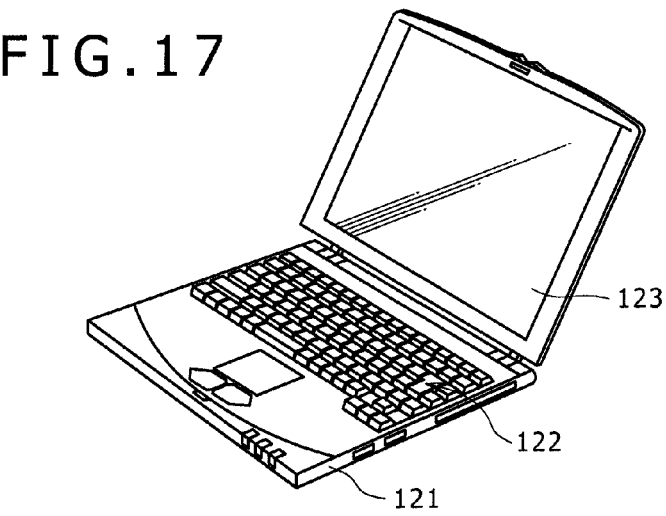
FIG. 17 is a perspective view of a note-type personal computer to which the present embodiment is applied.

Referring to FIG. 17, there is shown a perspective view of a note-type personal computer to which an embodiment of the present invention is applied. The note-type personal computer associated with the present embodiment has a main body block 121, a keyboard 122 that is operated to enter characters and so on and a display block 123 for display images and is manufactured by use of the display apparatus associated with the present embodiment as the display block 123.

Figure 18:
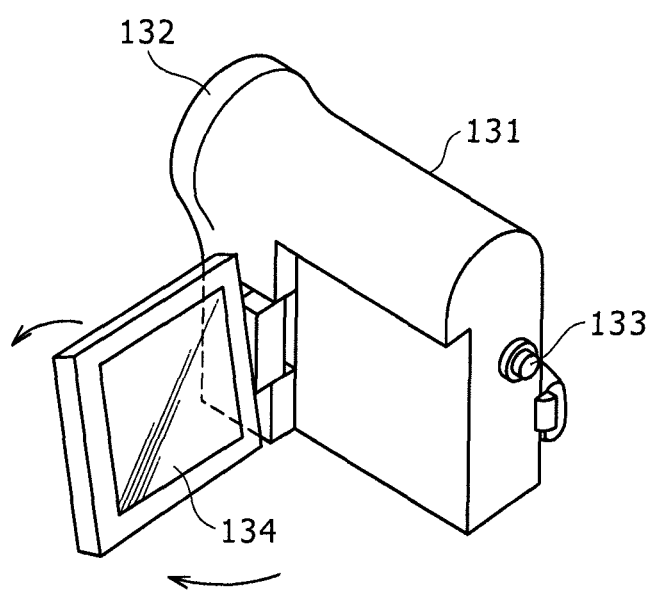
FIG. 18 is a perspective view of a video camera to which the present embodiment is applied.

Referring to FIG. 18, there is shown a perspective view of a video camera to which an embodiment of the present invention is applied. The video camera associated with the present embodiment has a main body block 131, a lens 132 for video taking arranged on a front side, a start/stop switch 133 that is operated for video taking, and a display block 134 and is manufactured by use of the display apparatus associated with the present embodiment as the display block 134.

Referring to FIGS. 19A to 19G, there is shown a portable terminal apparatus to which an embodiment of the present invention is applied, a mobile phone, for example. FIG. 19A shows a front view in which the mobile phone is unfolded, FIG. 19B shows a side view of FIG. 19A, FIG. 19C shows a front view in which the mobile phone is folded, FIG. 19D shows a left side view, FIG. 19E shows a right side view, FIG. 19F shows a top view, and FIG. 19G shows a bottom view. The mobile phone associated with the present embodiment has an upper case 141, a lower case 142, a link block (a hinge block here) 143, a display 144, a sub display 145, a picture light 146, a camera 147 and is manufactured by use of the display apparatus associated with the present embodiment as the display 144 and the sub display 145.

According to the embodiments of the present invention, the following effects can be obtained. To be more specific, at the time of detecting a switch state in the sensor structure, the initial state can be cleared defined, so that the conditions for all sensors are matched, thereby enabling the stable switch state detection.

In addition, the display apparatus according to the embodiments of the present invention can be used for all schemes for detecting the contact and non-contact of a human finger or a stylus for example and a position of the contact, so that this display apparatus is not limited to specific schemes. Further, for schemes, such as an optical scheme, in which positional detection is executed without contact with a sensor-integrated display apparatus, precharging of a known voltage before detection is effective in detection stability and initial state matching.

If the picture element electrode and the write wiring are shared for detection, stable detection can be achieved without considering a fluctuation between picture element electrodes. In addition, a detection error due to a match between a picture element write potential and a sensor output can be prevented, thereby simplifying the detection circuit configuration.

Because a precharge potential is held, if there is no external input, a precharge prior to writing to a picture element can be shared, for example, to make effective the allocation of timing at the time of high resolution display.

Further, changing precharge potentials for each switch allows the changing of threshold values for external input detection, thereby providing compatibilities with gray scale input. Still further, changing precharge potentials for each signal line allows the changing of the switch densities in a pseudo manner by providing a dead zone or change detections sizes in accordance with the sizes of buttons displayed as video on the display area, thereby increasing the freedom of design.

Moreover, making the precharge potential equal to the detection potential can put the switch in a non-driving state in a pseudo manner, thereby achieving the reduction in power dissipation.

Changing precharge potentials for each signal line allows the changing of response threshold values and the changing of switch densities in a partial manner. Consequently, a configuration can be provided in which the resolution is raised for stylus pressing and lowered for finger pressing on the display screen. Further, switches for response can be selected, thereby preventing a detection error by making unresponsive the switch stuck contacted due to an process error.

It should be noted that, in the above-mentioned embodiments of the present invention, liquid crystal display apparatuses are used as examples of the display apparatus; it is also practicable to use a plasma display device, an organic EL device, and other types of display devices. Also, in the above-mentioned embodiments of the present invention, an example was described in which the sensor (or the switch) for detecting external input is arranged inside a picture element of the display block; it is also practicable to arrange this sensor between substrates in an area other than the display block.

The present application contains subject matter related to that disclosed in Japanese Priority Patent Application JP 2009-012548 filed in the Japan Patent Office on Jan. 23, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A display apparatus comprising:
a display block having a plurality of picture pixel elements;
a switch arranged inside said display block and configured to be closed by an external pressure;
a detection block configured to detect whether said switch is closed based on a comparison between a signal supplied from said switch and a reference signal;
a precharge block configured to give a precharge potential to a wire conducting with one of electrodes of said switch before detection is executed in said detection block; and
a detection block potential supply block configured to give a predetermined potential to a wire conducting with the other electrode of said switch before detection is executed in said detection block, and further wherein the switch is selectively connected to a pixel electrode signal line, and wherein the switch is selectively connected to the pixel electrode signal line via a transistor that is controlled with a signal from a gate signal line and the gate signal line also controls application of a data signal to a corresponding picture element.

2. The display apparatus according to claim 1, wherein said precharge potential given by said precharge block and said predetermined potential given by said detection block potential supply block are different from each other.

3. The display apparatus according to claim 1, wherein said precharge potential given by said precharge block and said predetermined potential given by said detection block potential supply block are equal to each other.

4. A display apparatus comprising:
a display block having a plurality of picture pixel elements;
a switch, arranged between a drive element for driving one picture pixel element inside said display block and a further drive element for driving another picture pixel element, configured to be closed by an external pressure;
a detection block configured to detect whether said switch is closed on the basis of a comparison between a signal supplied from said switch and a reference signal; and
a precharge block configured to give, before executed detection in said detection block, a first precharge potential to a signal line of said drive element and a second precharge potential to a signal line of said further drive element that is different from said first precharge potential and, when executing detection in said detection block, and further wherein the switch is selectively connected to a pixel electrode signal line, and wherein the switch is selectively connected to the pixel electrode signal line via a transistor that is controlled with a signal from a gate signal line and the gate signal line also controls application of a data signal to a corresponding picture element.

5. A display apparatus comprising:
a display block having a plurality of picture pixel elements arranged in a matrix with a common potential switching for every horizontal scan period;
a switch, arranged for every other picture pixel element in said matrix of said plurality of picture pixel elements inside said display block, configured to be closed by an external pressure;
a detection block configured to detect whether said switch is closed on the basis of a comparison between a signal supplied from said switch and a reference signal;
a precharge block configured to give, before executing detection in said detection block, a precharge potential to a wire conducting with one of electrodes of said switch; and
a selection block configured to alternately select, in executing detection in said detection block, said switch corresponding to every other row of said plurality of picture elements and said switch corresponding to every other row that is different from said every other row of said plurality of picture elements in every horizontal scan period, and further wherein the switch is selectively connected to a pixel electrode signal line, and wherein the switch is selectively connected to the pixel electrode signal line via a transistor that is controlled with a signal from a gate signal line and the gate signal line also controls application of a data signal to a corresponding picture element.

6. A method of driving a display apparatus having a display block having a plurality of picture pixel elements and a switch arranged inside said display block, having an electrode closed by an external pressure, said method comprising:
  giving a precharge potential to a wire conducting with one of electrodes of said switch before a period in which a drive element for driving each of said plurality of picture element is on; and
  giving a detection potential to a wire conducting with another electrode of said switch after giving said precharge electrode and before giving a video signal to each of said plurality of picture elements in said period in which said drive element is on, thereby determining whether said switch is closed, and further wherein the switch is selectively connected to a pixel electrode signal line, and wherein the switch is selectively connected to the pixel electrode signal line via a transistor that is controlled with a signal from a gate signal line and the gate signal line also controls application of a data signal to a corresponding picture element.

7. A method of driving a display apparatus having a display block with a plurality of picture pixel elements and a switch, arranged between a drive element for driving one picture element inside said display block and another drive element for driving a further picture element, having an electrode to be closed by an external pressure, said method comprising:
  giving a first precharge potential to a signal line of said drive element;
  giving a second precharge potential different from said first precharge potential to a signal line of said further drive element;
  clearing the first precharge potential given to the signal line of said drive element before giving a video signal to said picture element; and
  detecting whether said switch is closed on the basis of a comparison between said second precharge potential to be supplied to said drive element via said switch from the signal line of said further drive element in a period in which said drive element and said further drive element are on and before the video signal is given to said picture pixel element and a predetermined reference potential, and further wherein the switch is selectively connected to a pixel electrode signal line, and wherein the switch is selectively connected to the pixel electrode signal line via a transistor that is controlled with a signal from a gate signal line and the gate signal line also controls application of a data signal to a corresponding picture element.

8. A method of driving a display apparatus having a display block with a plurality of picture pixel elements arranged in a matrix with a common potential switching for every horizontal scan period and a switch, arranged for every other picture element in said matrix of said plurality of picture pixel elements inside said display block, configured to be closed by an external pressure, said method comprising:
  giving a precharge potential to a wire conducting with one of electrodes of said switch before a period in which a drive element for driving each of said plurality of picture elements is on; and
  selecting alternately said switch corresponding to every other row of said plurality of picture pixel elements and said switch corresponding to every other row that is different from said every other row of said plurality of picture pixel elements in every horizontal scan period after giving said precharge potential and in said period in which said drive element is on, thereby detecting whether the selected switch is closed, and further wherein the switch is selectively connected to a pixel electrode signal line, and wherein the switch is selectively connected to the pixel electrode signal line via a transistor that is controlled with a signal from a gate signal line and the gate signal line also controls application of a data signal to a corresponding picture element.

9. An electronic device having a display apparatus, said display apparatus comprising:
  a display block having a plurality of picture elements;
  a switch, arranged inside said display block, configured to be closed by an external pressure;
  a detection block configured to detect whether said switch is closed on the basis of a comparison between a signal supplied from said switch and a reference signal;
  a precharge block configured to give a precharge potential to a wire conducting with one of electrodes of said switch before executing detection in said detection block; and
  a detection block potential supply block configured to give a predetermined potential to a wire conducting with another electrode of said switch when executing detection in said detection block, and further wherein the switch is selectively connected to a pixel electrode signal line, and wherein the switch is selectively connected to the pixel electrode signal line via a transistor that is controlled with a signal from a gate signal line and the gate signal line also controls application of a data signal to a corresponding picture element.

* * * * *